United States Patent
Noda et al.

(10) Patent No.: US 7,529,277 B2
(45) Date of Patent: May 5, 2009

(54) SEPARATING DEVICE AND METHOD AND SIGNAL RECEIVING DEVICE AND METHOD

(75) Inventors: Tatsushi Noda, Tokyo (JP); Hiroshi Adachi, Tokyo (JP); Yosuke Yamamoto, Tokyo (JP)

(73) Assignee: Sony Corporation (JP)

( * ) Notice: Subject to any disclaimer, the term of this patent is extended or adjusted under 35 U.S.C. 154(b) by 583 days.

(21) Appl. No.: 11/060,155

(22) Filed: Feb. 17, 2005

(65) Prior Publication Data

US 2005/0163165 A1 Jul. 28, 2005

Related U.S. Application Data (63) Continuation of application No. 09/715,989, filed on Nov. 17, 2000, now Pat. No. 6,937,618, which is a continuation of application No. PCT/JP99/02654, filed on May 20, 1999.

(30) Foreign Application Priority Data

May 20, 1998 (JP) .............................. P10-138296

(51) Int. Cl.
*H04J 1/00* (2006.01)
*H04J 3/04* (2006.01)
*H03M 7/00* (2006.01)
*H04N 7/173* (2006.01)

(52) U.S. Cl. ...................... 370/535; 370/486; 370/542; 341/50; 725/102

(58) Field of Classification Search ............ 348/E5.005, 348/E7.071, E7.094, 432.1, 473–474, 93–94; 370/468–486, 535–542; 375/E7.019, E7.022, 375/E7.222, E7.268, E7.275; 380/212–215; 725/71–135
See application file for complete search history.

(56) References Cited

U.S. PATENT DOCUMENTS

| | | | | |
|---|---|---|---|---|
| 5,400,401 A | * | 3/1995 | Wasilewski et al. | 380/212 |
| 5,418,782 A | * | 5/1995 | Wasilewski | 370/486 |
| 5,477,263 A | * | 12/1995 | O'Callaghan et al. | 725/102 |
| 5,502,497 A | | 3/1996 | Yamaashi et al. | |
| 5,594,492 A | * | 1/1997 | O'Callaghan et al. | 725/151 |
| 5,892,535 A | * | 4/1999 | Allen et al. | 725/36 |
| 6,002,694 A | | 12/1999 | Yoshizawa et al. | |
| 6,249,532 B1 | | 6/2001 | Yoshizawa et al. | |
| 6,335,763 B1 | | 1/2002 | Nishio et al. | |
| 6,609,251 B1 | * | 8/2003 | Yoneda | 725/71 |
| 6,826,202 B2 | * | 11/2004 | Takashimizu et al. | 370/535 |
| 2001/0052126 A1 | | 12/2001 | Nanki et al. | |
| 2001/0055322 A1 | * | 12/2001 | Domon | 370/537 |
| 2002/0159485 A1 | | 10/2002 | Takashimizu et al. | |
| 2004/0004560 A1 | * | 1/2004 | Okamoto et al. | 341/50 |

(Continued)

FOREIGN PATENT DOCUMENTS

EP 0749244 A2 12/1996

(Continued)

*Primary Examiner*—Man Phan
(74) *Attorney, Agent, or Firm*—Lerner, David, Littenberg, Krumholz & Mentlik, LLP (57) ABSTRACT

A separating device and method and a signal receiving device and method are presented. The separating device and method receive plural data streams and then separate and extract at least a portion of data from the received data streams. The signal receiving device and method receive plural data streams and then select, separate and extract at least a portion of the data from the data streams. Then the signal receiving device and method apply signal processing to the portion of the data that has been selected, separated and extracted.

4 Claims, 8 Drawing Sheets

U.S. PATENT DOCUMENTS

| | | | |
|---|---|---|---|
| 2006/0153104 A1* | 7/2006 | Lee et al. | 370/270 |
| 2007/0220584 A1* | 9/2007 | Lee et al. | 725/135 |

FOREIGN PATENT DOCUMENTS

| | | |
|---|---|---|
| EP | 0 774 753 A2 | 5/1997 |
| EP | 0784401 A2 | 7/1997 |
| EP | 0835029 A2 | 4/1998 |
| JP | 5-328321 | 12/1993 |
| JP | 8-307787 A | 11/1996 |
| JP | 9-162821 | 6/1997 |
| JP | 9-186665 | 7/1997 |
| JP | 9-186665 A | 7/1997 |
| JP | 9-307826 | 11/1997 |
| JP | 9-307826 A | 11/1997 |
| JP | 10-041909 A | 2/1998 |
| JP | 10-271464 | 10/1998 |
| JP | 11-4420 | 1/1999 |

* cited by examiner

FIG. 8

SEPARATING DEVICE AND METHOD AND SIGNAL RECEIVING DEVICE AND METHOD

CROSS-REFERENCE TO RELATED APPLICATION

This application is a continuation of U.S. patent application Ser. No. 09/715,989 filed Nov. 17, 2000, which is a continuation of International Application No. PCT/JP99/02654 filed May 20, 1999.

BACKGROUND OF THE INVENTION

The present invention relates to a separating device and method and a signal receiving device and a signal receiving method, and is suitably applied to a signal receiving device for the digital broadcasting system.

SUMMARY OF THE INVENTION

In the conventional digital broadcasting system, the transmitting end conducts the compression coding to the video and audio signals of each program with the MPEG2 (Moving Picture Experts Group Phase 2) standard, and by dividing the various kinds of data to be broadcast, such as the obtained compression-coded data, control data and the like into 184-byte segments and adding a TS (transport stream) header of 4-bytes containing sync code (47H) and PID (packet identification, 13-bits) to its head, forms a 188-byte TS packet.

Furthermore, the transmitting end forms a transport stream by multiplexing the obtained TS packet for plural programs and the TS packet storing program information, QPSK (Quadrature Phase Shift Keying)-modulates these, and sends out the resultant as a digital broadcasting signal.

On the other hand, the receiving end receives and demodulates the digital broadcasting signal, and extracts the TS packets for the program specified by the user included in the obtained transport stream based on the PID. Then it decodes video and audio data stored in the TS packets to display obtained pictures and to give sound from a speaker.

Accordingly, in the digital broadcasting system, while the transmitting end can multiplex audio and video data for plural programs for transmission, the user can select and watch a desired program from among these programs at the receiving end.

However, in the signal receiving device of the digital broadcasting system, the device capable of receiving only one sequence of transport stream is used as a demultiplexer to extract the TS packets for a specified program from the transport stream obtained by demodulating the digital broadcasting signal.

For this reason, when plural sequences of digital broadcast signals are received, an application in the signal receiving device for displaying pictures of plural programs on the multi-screen needs the same number of demultiplexers as there are digital broadcasting signals. Therefore, this causes the problem of increasing circuit size.

Accordingly, the conventional signal receiving device has the problem in that it is difficult to improve its operability while minimizing its size. For example, it is difficult to make an efficient application for displaying without increasing the circuit size.

The present invention has been done considering the above point and intends to propose a separating device and its method and a signal receiving device and its method capable of remarkably improving the operability with a simple structure.

To obviate such problems according to the present invention, the separating device provides a selecting means for receiving plural data streams formed of plural program data multiplexed per a fixed unit of 188 bytes and selecting a corresponding part or all of the data streams from among the received plural data streams, and a separating/extracting means for separating/extracting program data of a specified program included in each data stream selected by the selecting means.

As a result, this separating device can extract program data of a desired program from among plural data streams formed by multiplexing plural programs, and for example, it can make an application efficient with a simple structure in the signal receiving device.

Furthermore, according to the present invention, the separating method comprises a first step of receiving plural data streams formed of plural program data multiplexed per the fixed unit and of selecting a corresponding part or all of data streams from among the received plural data streams and a second step of separating/extracting program data of a specified program included in each data stream selected at the first step.

As a result, this separating method can extract program data of a desired program from among plural data streams formed by multiplexing plural programs, and for example, can easily make an application efficient in the signal receiving device.

Furthermore, according to the present invention, the signal receiving device comprises a separating means for receiving data streams or data streams which are formed by multiplexing per the fixed unit plural program data obtained by modulating inputted transmission signals, for selecting a corresponding part or all of data streams from among the plural data streams received, and for separating/extracting program data of a specified program included in each data stream selected, and a signal processing means for applying prescribed signal processing to the part or all of the data separated and extracted by the separating means at the same time.

As a result, this receiving device can extract program data of a desired program from among plural data streams formed by multiplexing plural programs and can make an application efficient with a simple structure.

Furthermore, according to the present invention, the signal receiving method comprises a first step of receiving input data streams or data streams which are formed by multiplexing per the fixed unit plural program data obtained by modulating input transmission signals, of selecting a corresponding part or all of the data streams from among the received plural data streams, a second step of separating and extracting program data of a specified program included in each data stream selected at the first step, and a third step of applying prescribed signal processing to the part or all of the data separated and extracted at the second step at the same time.

As a result, this signal receiving method can extract program data of the desired program from among plural data streams formed by multiplexing plural programs and can easily make an application efficient.

In accordance with an embodiment of the present invention, a separating device for separating/extracting program data is provided. The program data is of one or more specified programs from a plurality of data streams formed of plural program data multiplexed per a fixed unit. The separating device comprises a selecting unit and a separator. The selecting unit is operable to receive the plurality of data streams and to select at least part of the plurality of data streams. The separator is operable to extract program data of the one or more specified programs from the at least part of the plurality of data streams.

In an alternative, the separating device further comprises a multiplexer operable to produce the at least part of the plurality of data streams or program data of the one or more specified desired programs to be sent out from the separator. In another alternative, the plurality of data streams are formed of the plural program data packetized and multiplexed per the fixed unit, and the separator is separable to output program data of the one or more specified programs as packetized data.

In accordance with another embodiment of the present invention, a method for separating/extracting program data of one or more specified programs is provided. The program data is from a plurality of data streams formed of plural program data multiplexed per a fixed unit. The method comprises receiving the plurality of data streams and selecting at least part of the plurality of data streams; and extracting program data of the one or more specified programs from the at least part of the plurality of data streams.

In an alternative, the method further comprises multiplexing said at least part of the plurality of data streams or program data of the one or more specified programs to be sent out after the extracting step. In another alternative, each of the plurality of data streams is formed of the plural program data packetized and multiplexed per the fixed unit, and the extracting step outputs program data of the one or more specified programs as packetized data.

In accordance with yet another embodiment of the present invention, a signal receiving device is provided the signal receiving device is for receiving a plurality of data streams formed of program data of plural programs multiplexed per a fixed unit. The data streams are transmitted as multiple transmission signals or as part of a single transmission signal including distinct data streams. The signal receiving device comprises a selecting unit, a separator, and a decoder. The selecting unit is operable to input the data streams and to select at least a part of the input data streams. The separator is operable to extract the program data of one or more specified programs included in the selected data streams. The decoder is operable to decode the program data extracted by the separator.

In an alternative, the signal receiving device further comprises a multiplexer operable to multiplex each of the data streams selected by the selecting unit or the program data of the one or more specified programs to be sent out from the separator. In another alternative, the plurality of data streams are formed of the program data packetized and multiplexed per the fixed unit, and the separator is operable to output program data of the one or more specified programs as packetized data.

In accordance with a further embodiment of the present invention, a method of receiving a plurality of data streams is provided. The data streams are formed of program data of plural programs multiplexed per a fixed unit, or a transmission signal formed of the plurality of data streams. The method comprises inputting the plurality of data streams multiplexed per the fixed unit or the plurality of data streams formed of the transmission signal; selecting a part or all of the plurality of data streams; extracting program data of one or more specified programs included in each of the plurality of data streams; and decoding the program data.

In an alternative, the method further comprises multiplexing each of the plurality of data streams or program data of the one or more specified programs. In another alternative, the plurality of data streams are formed of the program data packetized and multiplexed per the fixed unit; and the extracting step outputs program data of the one or more specified programs as packetized data.

In accordance with another embodiment of the present invention, an apparatus for receiving, separating and decoding a plurality of data streams is provided the apparatus comprises a receiver, a separating device, and a decode processor. The receiver is operable to produce an initial data stream containing multiplexed data packets representing a plurality of data programs from a plurality of transmitted data streams received over a communication channel. The separating device is operable to produce an intermediate data stream containing multiplexed data packets representing one or more selected ones of the data programs chosen from the initial data stream. And the decode processor is operable to decode the intermediate data stream such that the multiplexed data packets representing the selected data programs are associated with one another.

In an alternative, the separating device includes a multiplexer operable to produce a multiplexed data stream including the initial data stream, and a separator operable to extract the selected data programs from the multiplexed data stream. In this case, the decode processor may include a video decode processor, an audio decode processor, a display generator, and an audio generator. The video decode generator is operable to decode a video portion of the intermediate data stream corresponding to the selected data programs and to generate resultant video data. The audio decode processor is operable to decode an audio portion of the intermediate data stream corresponding to one of the selected data programs and to generate resultant audio data. The display generator is operable to process the resultant video data for multi-screen displaying. And the audio generator is operable to process the resultant audio data for playing.

In another alternative, the separating device preferably includes a separator operable to extract the selected data programs from the initial data stream, and a multiplexer operable to produce a multiplexed data stream including each of the selected data programs extracted by the separator. In this case, the decode processor desirably includes a video decode processor, an audio decode processor, a display generator, and an audio generator. The video decode processor is operable to decode a video portion of the intermediate data stream corresponding to the selected data programs and to generate resultant video data. The audio decode processor is operable to decode an audio portion of the intermediate data stream corresponding to one of the selected data programs and to generate resultant audio data. The display generator is operable to process the resultant video data for multi-screen displaying. And the audio generator is operable to process the resultant audio data for playing.

In accordance with a further embodiment of the present invention, an apparatus for inputting a plurality of received data streams containing multiplexed data packets representing a plurality of data programs received over a communication channel and for producing an intermediate data stream including one or more selected data programs is provided. The apparatus comprises a multiplexer operable to produce a multiplexed data stream including the received data streams and the one or more selected data programs, and a separator operable to extract the selected data programs from the multiplexed data stream.

In accordance with yet another embodiment of the present invention, an apparatus for inputting a plurality of received data streams containing multiplexed data packets representing a plurality of data programs received over a communication channel and for producing an intermediate data stream including one or more selected ones of the data programs is provided. The apparatus comprises a separator operable to extract each of the selected data programs from the received data streams, and a multiplexer operable to produce a multiplexed data stream including the selected data programs extracted by the separator.

In accordance with another embodiment of the present invention, a method for decoding packet data is provided. The method comprises producing at least one initial data stream containing multiplexed data packets, the multiplexed data packets representing a plurality of data programs from a plurality of distinct signals received over at least one communication channel; producing at least one intermediate data stream containing selected multiplexed data packets representing one or more selected ones of the data programs chosen from the at least one initial data stream; and decoding the at least one intermediate data stream such that the selected multiplexed data packets representing each of the one or more selected data programs are associated with one another.

In an alternative, the step of producing the at least one intermediate data stream includes multiplexing each of the initial data streams onto a multiplexed data stream; and separating each of the selected data programs from the multiplexed data stream. In this case, the step of decoding the at least one intermediate data stream preferably includes decoding a video portion of the at least one intermediate data stream corresponding to the one or more selected data programs; and decoding an audio portion of the at least one intermediate data stream corresponding to the one or more selected data programs.

In another alternative, the step of producing the at least one intermediate data stream includes separating each of the selected data programs from the at least one initial data stream; and multiplexing each of the selected data programs onto a multiplexed data stream. In this case, the step of decoding the at least one intermediate data stream desirably includes decoding a video portion of the at least one intermediate data stream corresponding to the one or more selected data programs; and decoding an audio portion of the at least one intermediate data stream corresponding to the one or more selected data programs.

In accordance with yet another embodiment of the present invention, a method of producing at least one intermediate data stream from a plurality of distinct initial data streams is provided. The distinct initial data streams contain multiplexed data packets representing a plurality of data programs received over at least one communication channel, and the intermediate data stream includes one or more selected ones of the data programs. The method comprises multiplexing the at least one initial data stream onto a multiplexed data stream; and separating each of the selected data programs from the multiplexed data stream.

In accordance with a further embodiment of the present invention, a method of producing at least one intermediate data stream from a plurality of distinct initial data streams is provided. The distinct initial data streams contain multiplexed data packets representing a plurality of data programs received over at least one communication channel, and the intermediate data stream includes one or more selected ones of the data programs. The method comprises separating each of the selected data programs from the plurality of distinct initial data streams; and multiplexing each of the selected data programs onto a multiplexed data stream.

DETAILED DESCRIPTION

The present invention will be described in detail with reference to the accompanying drawings.

Figure 1:
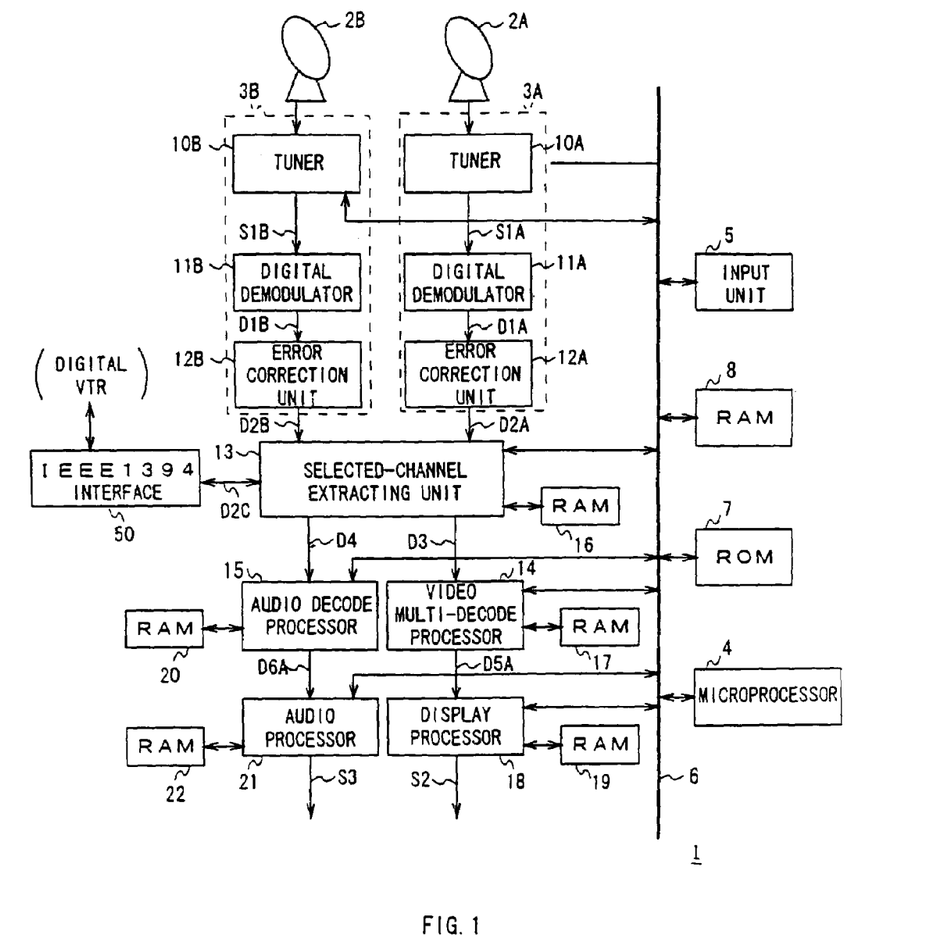
FIG. 1 is a block diagram showing the structure of a signal receiving device according to the present invention.

Structure of Signal Receiving Device according to the Embodiment of the Present Invention In FIG. 1, 1 generally shows a signal receiving device of the digital broadcasting system according to the embodiment of the present invention. It has first and second receiver systems 3A and 3B connected respectively to-separate antennae 2A and 2B and can simultaneously receive at least two programs with them under the control of a microprocessor 4. Note that in FIG. 1, two antennae are provided. However, a signal can be received by one antenna. The signal can be divided into two signals to be supplied to the first and second receiving systems. That is, providing two antennae allows the signal receiving device to receive digital broadcasting signals from two satellites. On the other hand, providing one antenna allows the signal receiving device to select signals that correspond to two transponder of a digital broadcasting signal from one satellite.

Channel information of a program desired by a user, inputted with an input unit 5, is supplied to the microprocessor 4 from the input unit 5 through a control bus 6. That is, the input unit 5 is an infrared ray receiving unit, in which the channel information from a remote controller (not shown) is input thereto and is supplied to the microprocessor 4 through the control bus 6.

The microprocessor 4 controls tuners 10A and 10B of the first and the second receiver systems 3A and 3B according to the supplied channel information based on a program previously stored in a ROM (Read Only Memory) 7. Note that, a RAM (Random Access Memory) 8 serves as a memory means used for processing of the microprocessor.

As a result, under the control of the microprocessor 4, the tuners 10A and 10B select the respectively corresponding digital broadcasting signals from among a plurality of digital broadcasting signals received with the antennae 2A and 2B, and transmit these as selected signals S1A and S1B to the digital demodulators 11A and 11B, respectively.

The digital demodulators 11A and 11B conduct the digital demodulation processing to the supplied selected signals S1A and S1B and transmit the resultant demodulated data D1A and D1B to error correction units 12A and 12B, respectively. Then, the error correction units 12A and 12B apply the prescribed error correction processing to the supplied demodulated data D1A and D1B and transmit the resultant transport stream data (hereinafter, referred to as TS data) D2A and D2B to a selected-channel extracting unit 13.

Under the control of microprocessor 4, the selected-channel extracting unit 13 extracts and multiplexes the TS packet data for pictures and the TS packet data for sound of the specified program from among two sequences of TS data D2A and D2B supplied and the TS data D2C supplied from a digital video tape recorder (VTR) via an IEEE1394 interface 50. Then, the resultant video TS data D3 and audio TS data D4 are transmitted to an video multi-decode processor 14 and an audio decode processor 15, respectively, or are stored in a RAM 16. Note that, the video TS data D3 is a signal generated by multiplexing TS data for one or plural program(s). In addition, the audio TS data D4 is TS data for one program (for example, a program displayed on a main screen of programs displayed on the multi-screen).

Under the control of the microprocessor 4, the video multi-decode processor 14 simultaneously decodes the video TS packet data for one or plural program(s) included in the supplied video TS data D3 with a RAM 17 and transmits the resultant video data D5A for one or plural program(s) to a display processor 18.

The display processor 18, under the control of the microprocessor 4, executes the prescribed signal processing with a RAM 19 for multi-screen displaying, and transmits the obtained display signal S2 to a monitor (not shown) to display pictures based on the display signal S2 on the multi-screen, in the case where pictures of plural programs are included in the video data D5A. Note that, in the case where pictures of only one program are included in the video data D5A, the prescribed signal processing is executed so that the picture can be display on the screen all over as a conventional device.

On the other hand, under the control of the microprocessor 4, audio decode processor 15 decodes the supplied audio TS packet data D4 with a RAM 20 and then, transmits the resultant audio data D6A to an audio processor 21.

Then, under the control of the microprocessor 4, the audio processor 21 performs the digital-to-analog conversion on the supplied audio data and outputs it to the speaker (not shown), or converts the supplied audio data into an optical digital sound output signal to output. RAM 22 is bidirectionally coupled to the audio processor 21.

In this way, this signal receiving device 1 can display pictures of plural programs, specified from two different sequences of digital broadcasting signals and the TS data obtained via the IEEE1394 interface 50 by the user, on the multi-screen by a method of dividing the screen, and at the same time, can give sound of any one of the programs from the speaker.

On the other hand, when the user manipulates the remote commander to specify one program and the input unit 5 receives a manipulated signal transmitted from the remote commander, the microprocessor 4 controls only one of the tuners 10A and 10B of the first and second receiver systems 3A and 3B and the IEEE1394 interface 50.

As a result, the selected digital broadcasting signal of the tuner 10A or 10B of the first or the second receiver system 3A or 3B is subjected to the demodulating processing and the error correction by the following digital demodulator 11A or 11B and error correction unit 12A or 12B to restore the transport stream. Then, the transport stream is supplied to the selected-channel extracting unit 13 as TS data D2A or D2B. On the other hand, in the case of specifying the digital signal obtained via the IEEE1394 interface 50, the digital signal obtains TS data D2C in the form of a transport stream. Then, the TS data D2C is supplied to the selected-channel extracting unit 13.

Then, the selected-channel extracting unit 13 separates video TS packets and audio TS packets for the program specified by the user from the TS data D2A or D2B or the TS data D2C obtained via the IEEE1394 interface 50 under the control of the microprocessor 4. The obtained video TS data D3 and audio TS data D4 are supplied to the video multi-decode processor 14 and audio decode processor 15 respectively.

Then, the video TS data D3, after being decoded by the video multi-decode processor 14 under the control of the microprocessor 4, is converted into an analog signal by the display processor 18 and is sent to the monitor as a display signal S2. As a result, the pictures of the programs specified by the user are displayed on the monitor.

Moreover, the audio TS data D4, after being decoded by the audio decode processor 15 under the control of the microprocessor 4, is converted to an analog signal by the audio processor 21 and transmitted to the speaker as an audio signal S3. As a result, the sound of the program specified by the user is given from the speaker.

In this way, signal receiving device 1 can select one sequence of TS data from among two sequences of TS data D2A and D2B to be given to the selected-channel extracting unit 13 from the first and the second receiver systems 3A and 3B and the TS data D2C obtained via the IEEE1394 interface 50, to display the pictures and to give sound with respect to the specified program.

Structure of Selected-Channel Extracting Unit 13

Figure 2:
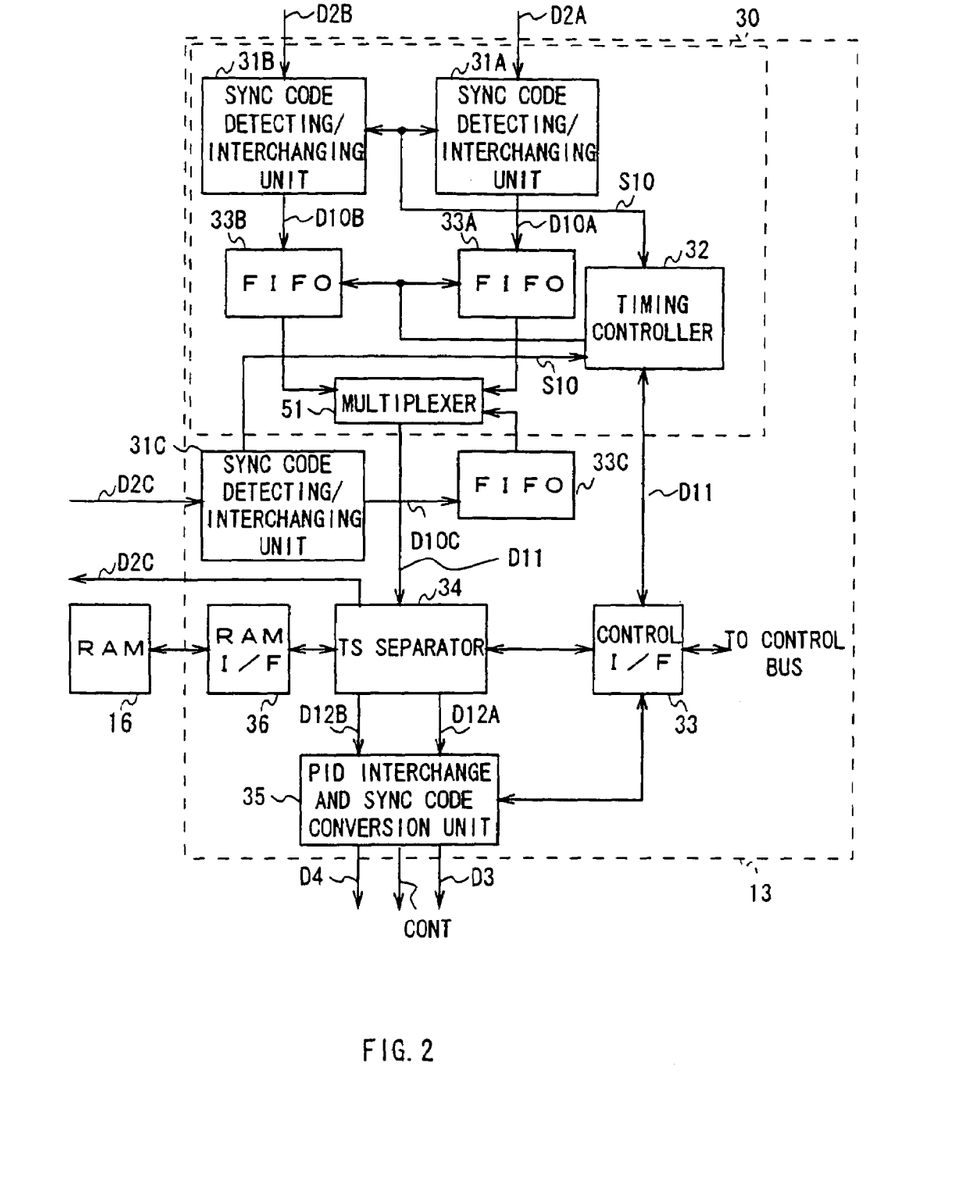
FIG. 2 is a block diagram showing the structure of a selected-channel extracting unit.

In practice, the selected-channel extracting unit 13 is constructed as shown in FIG. 2, in which the TS data D2A and D2B to be supplied respectively from the error correction units 12A and 12B of the first and second receiver systems 3A and 3B are supplied into the corresponding first or second sync code detecting/interchanging units 31A and 31B of the TS selector/multiplexer 30.

The first and second sync code detecting/interchanging units 31A and 31B detect sync code stored in the TS header of each TS packet included in the respectively supplied TS data D2A and D2B, and transmit a sync code detection signal S10 to a timing controller 32 whenever detecting a sync code.

In addition to this, the first and the second sync code detecting/interchanging units 31A and 31B rewrite the sync code of each TS packet to an ID code for internal processing to be given from the microprocessor 4 through the control bus 6, a control interface 33 and the timing controller 32 and changes identical PIDs (Packet Identification) so that the PIDs of TS packets of each program specified can be identified even if the PIDs are the same. Then, these TS packet data D10A and D10B are sequentially stored in the corresponding first and the second FIFOs (First-in First-out) 33A and 33B.

On the other hand, the timing controller 32, based on the sync code detection signals S10 supplied from the first and second sync code detecting/interchanging units 31A and 31B and the control signal supplied from the microprocessor 4 through the control interface 33, reads out, for example, data in a TS packet unit (in a 188-byte fixed unit) from the first and second FIFOs 33A and 33B alternately with a double clock frequency, multiplexes the first and second TS data D2A and D2B with a multiplexer 51, and transmits the resultant stream data to a TS separator 34 via the multiplexer 51 as selected/multiplexed data D11, in the case where each of the plural programs specified by the user is included in one of two transport streams.

On the other hand, the third sync code detecting/interchanging unit 31C detects a sync code stored in the TS header of each TS packet included in the supplied TS data D2C, and transmits the sync code detection signal S10 to the timing controller 32 whenever detecting a sync code.

Further, even when a TS packet included in the input TS data D2C has the same PID as a TS packet for each program specified by the first and second sync code detecting/interchanging unit 31A and 31B, the third sync code detecting/interchanging unit 31C rewrites the sync code of each TS packet to the identification code for internal processing supplied from the microprocessor and interchanges the identical PIDs (Packet Identification) so that the PIDs can be identified. Thereafter, it sequentially stores the TS packet data D10C to the corresponding third FIFO (First-In First-Out) 33C.

The timing controller 32, based on the sync code detection signal 31C supplied from the third sync code detecting/interchanging unit 31C and the control signal supplied from the microprocessor 4 through the control interface 33, reads, for example, data in the TS packet unit (in a 188-byte unit) from the first, second and third FIFOs 33A, 33B and 33C alternately with a threefold clock frequency, multiplexes the first, second and third TS data D2A, D2B and D2C with the multiplexer 51, and transmits the resultant stream of data to the TS separator 34 as selected/multiplexed data D11, in the case where each of plural programs specified by the user are included in each of three transport streams.

In this case, firstly, the TS separator 34 extracts the TS packet having the program information included in the digital broadcasting signal selected at the first and the second receiver systems 3A and 3B from the selected/multiplexed data D11 and the TS packet having the program information included in the TS data D2C obtained through the IEEE1394 interface 50, and transmits these to the microprocessor 4 through the control interface 33 and the control bus 6 in order.

Then, the microprocessor 4 obtains the PID of each video and audio TS packet for the program specified based on the program information to be supplied from the TS separator 34 and transmits it to the TS separator 34 through the control bus 6 and the control interface 33 in order.

Thus, the TS separator 34 extracts TS packets of such as video, audio, control data and data signal for each program specified from among the selected/multiplexed data D11 based on the PID given from the microprocessor 4, and transmits the control information and data signal for each program to the microprocessor 4 via the control interface 33 and the same time, transmits the video and audio TS packet data for each program to a PID interchange and sync code conversion unit 35 or stores them in the RAM 16 through the RAM interface 36, as the video TS packet data D12A and audio TS packet data D12B.

In this connection, the TS separator 34 can select TS packets corresponding to the program selected by the user from among the TS data D2A and D3B received by the first and second receiver system 3A and 3B to generate new TS data D2C, and can record it on the digital VTR through the IEEE1394 interface 50. In this case, the TS separator 34 is to output the relation between the current PID and the former one to the digital VTR through the IEEE1394 as interchange information when the TS packet having the PID interchanged exists in the TS data D2C.

Under the control of the microprocessor 4, the PID interchange and sync code conversion unit 35 rewrites the ID code and PID attached by the first, second, and third sync code detecting/interchanging units 31A, 31B and 31C to original synchronization codes with respect to each video and audio TS packet of the supplied video TS packet data D12A and audio TS packet data D12B.

Furthermore, in the case where the PIDs of the video and audio TS packets for plural programs specified by the user are identical, the PID interchange and sync code conversion unit 35 transmits information to specify the channel numbers of TS packets having identical PIDs to the video multi-decode processor 14 or to the audio decode processor 15 through a control line CONT.

On the other hand, in the case where only one program is specified by the user with the input unit 5, under the control of the microprocessor 4, the timing controller 32 reads out the data in the TS packet unit (in a 188-byte unit) with a normal speed only from the corresponding first, second or third FIFO 33A, 33B or 33C based on the sync code detection signal S10 to be given from the corresponding first, second or third sync code detecting/interchanging unit 31A, 31B, 31C and transmits this to the TS separator 34 as the selected/multiplexed data D11.

At this point, the TS separator 34 extracts TS packets having program information from the supplied selected/multiplexed data D11, and transmits these to the microprocessor 4 through the control interface 33 and the control bus 6, in order.

Then, the microprocessor 4 obtains the PID of each video and audio TS packet for programs specified by the user based on the program information to be supplied from the TS separator 34, and outputs this to the TS separator 34 through the control bus 6 and the control interface 33 in order.

Thus, the TS separator 34 extracts each TS packet of such as picture, audio, control data and data signal for the specified program from the selected/multiplexed data D11 based on the PID supplied from the microprocessor 4, and transmits the control information and data signal to the microprocessor 4 through the control interface 33 and the control bus 6 in order and the same time, transmits data of each TS packet for picture and sound to the PID interchange and sync code conversion unit 35 or stores them in the RAM 16 through the RAM interface 36, as the video TS packet data D12A and audio TS packet data D12B.

In the case where only one program is specified by the user, since it is impossible that PIDs are identical, the PID interchange and sync code conversion unit 35 does not interchange a PID. Therefore, the PID interchange and sync code conversion unit 35 transmits the supplied video TS packet data D12A to the video multi-decode processor 14 as the video TS packet stream data D3 as it is and transmits the supplied audio TS packet data D12B to the audio decode processor 15 as the audio TS packet stream data D4 as it is, under the control of the microprocessor 4.

In this way, the selected-channel extracting unit 13 can select and output the video and audio TS packets for one or more programs specified from the TS data D2A and D2B supplied from the error correcting units 12A and 12B in the first and second receiver systems 3A and 3B respectively and the TS data D2C supplied through the IEEE1394 interface 50.

Figure 3:
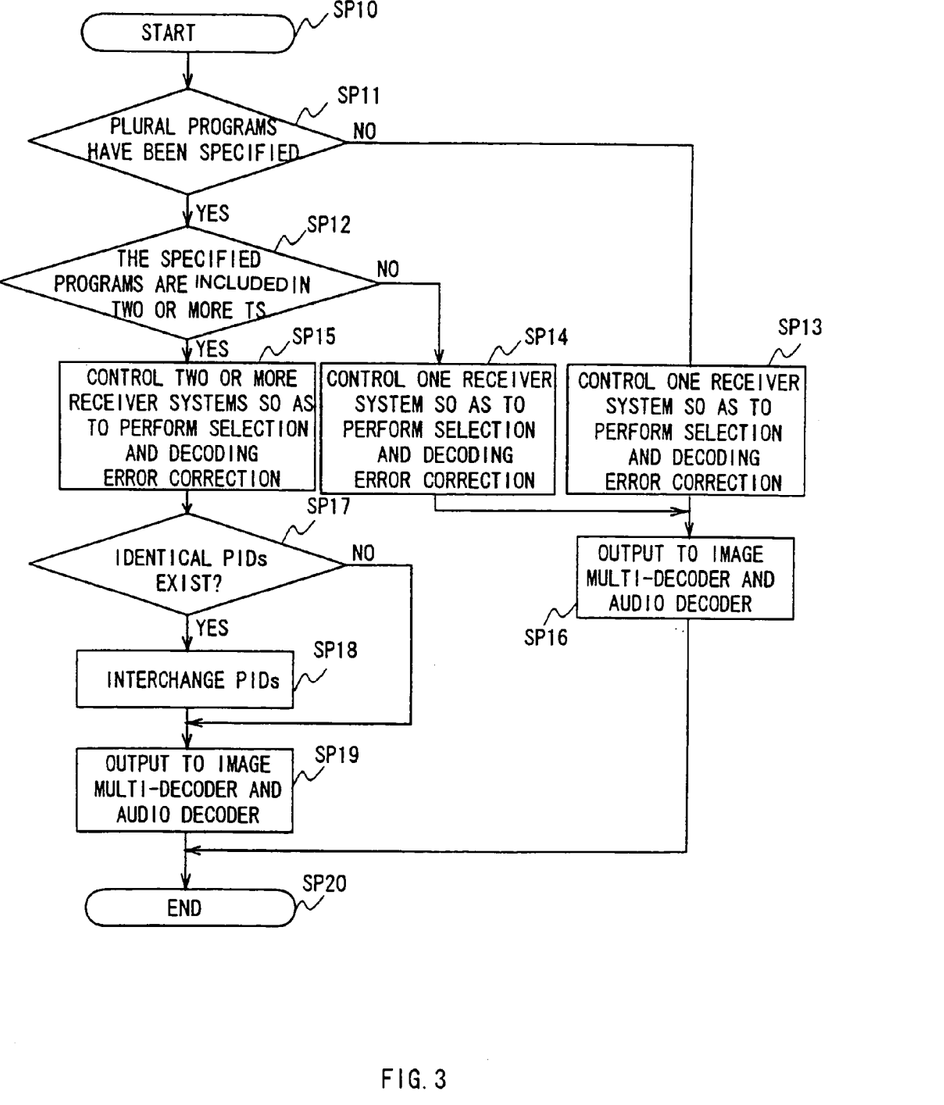
FIG. 3 is a flowchart explaining a processing procedure to extract (a) selected channel(s).

FIG. 3 shows a processing procedure of extracting a selected channel in the selected-channel extracting unit 13. The selected-channel extracting unit 13 controlled by the microprocessor 4 enters the processing procedure in step SP10, and then judges the number of programs specified by the user at following step SP1. When one program is specified, the selected-channel extracting unit 13 proceeds to step SP13 to perform a selection and a decoding error correction by controlling one receiver system (out of the first and second receiver systems 3A and 3B and the third receiver system through the IEEEE1394 interface 50). Note that the IEEE1394 interface 50 also performs the selection and the decoding error correction as required.

Then, the selected-channel extracting unit 13 outputs the resultant video TS packet stream data D3 and the audio TS packet stream data D4 to the video multi-decoder 14 and the audio decoder 15 at step SP16, and terminates the processing procedure at step SP20.

On the other hand, in the case where plural programs are specified at step SP11, the selected-channel extracting unit 13 proceeds to step SP12. In the case where the specified programs are included only in the TS data obtained through one of three receiver systems (the first and second receiver system 3A and 3B and the third receiver system through the IEEE1394 interface 50), the selected-channel extracting unit 13 obtains a negative result at step SP12. Then, it proceeds to step SP14 to perform the selection and the decoding error correction by controlling one receiver system (out of the first and second receiver systems 3A and 3B and the third receiver system through the 1EEE1934 interface 50). In this connection, the IEEE1394 interface 50 also performs the selection and the error correction as required.

After that, the selected-channel extracting unit 13 outputs the resultant video TS packet stream data D3 and the audio TS packet stream data D4 to the video multi-decoder 14 and the audio decoder 15 at step SP16, and terminate the processing procedure at step SP20.

On the other hand, when a positive result is obtained at step SP12, that is, when the programs specified by the user are included in TS data obtained by two or more receiver systems (two or more out of the first and second receiver systems 3A and 3B and the third receiver system through the IEEE1394 interface 50), the selected-channel extracting unit 13 obtains the positive result at step SP12. Then it proceeds to step SP15 to perform the selection and the error correction by controlling two or more receiver systems (two or more out of the first and second receiver systems and the third receiver system through the IEEE1394 interface 50) having the TS data specified.

After that, the selected-channel extracting unit 13 proceeds the following step SP17 to judge whether or not there are identical PIDs in the selected TS packets. When identical PIDs exist, it proceeds to step SP18 to interchange the PIDs. On the other hand, the selected-channel extracting unit proceeds to step SP19 when identical PIDs do not exist.

The selected-channel extracting unit 13 outputs the video TS packet stream data D3 and the audio TS packet stream data D4 to the video multi-decoder 14 and the audio decoder 15 at step SP19, and then terminates the processing procedure at step SP20.

Figure 4:
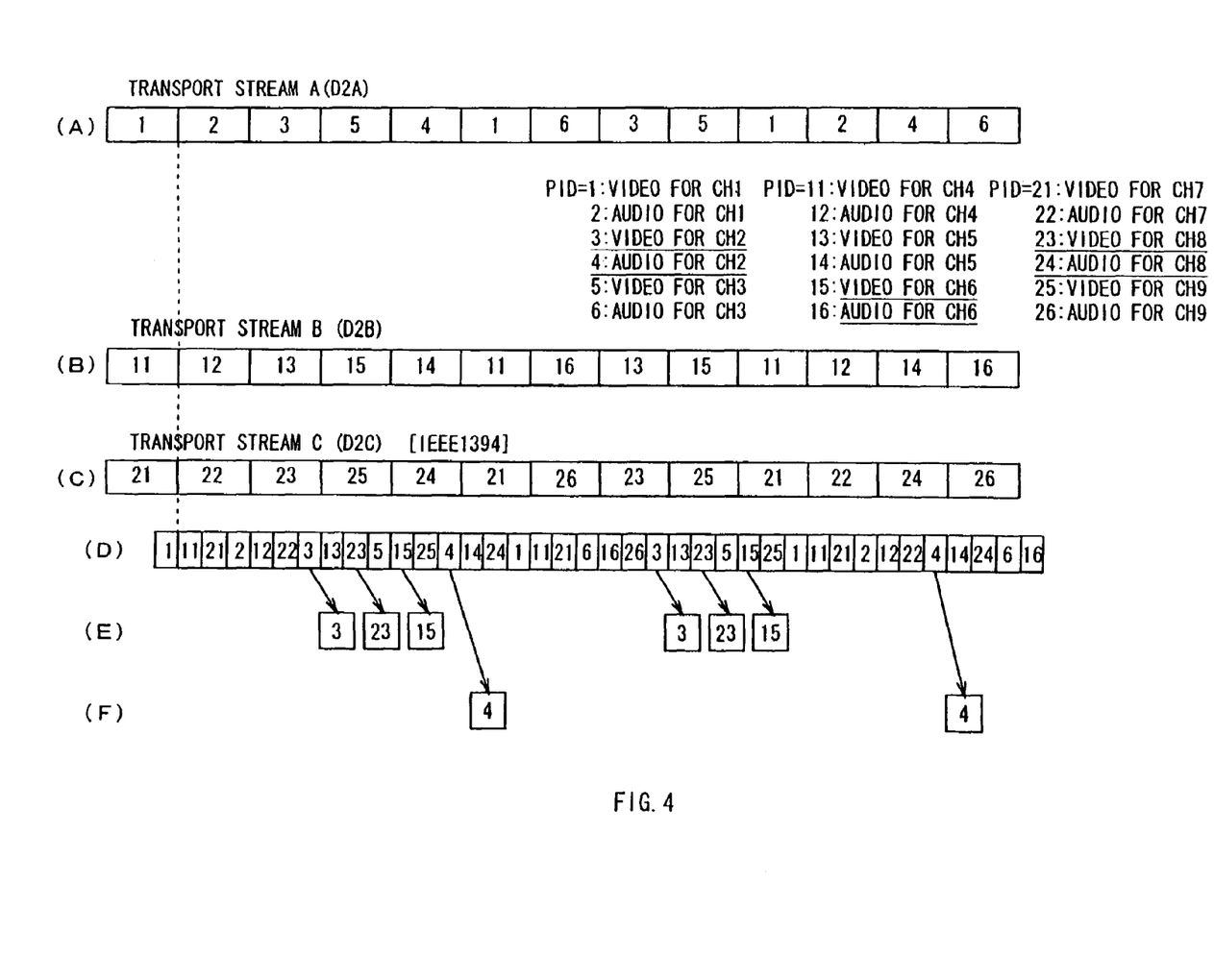
FIG. 4 is a schematic diagram explaining extracting processing to select one program from each of three transport streams.

According to the above-mentioned structure, in the case of selecting one program from each of digital broadcasting signals and the TS data reproduced from the digital VTR D2A (FIG. 4 (A)), D2B (FIG. 4(B)) and D2C (FIG. 4(C)) respectively corresponding to the specified programs in the first and second receiver systems 3A and 3B and the third receiver system for receiving TS data through the IEEE1394 interface 50 as shown in FIG. 4, the receiving device 1 reads three TS data D2A, D2B and D2C from the FIFOs with the timing controller 32 with a threefold clock. And these data becomes data compressed in a temporal axis direction as shown in FIG. 4(D).

TS separator 34 extracts only TS packets having video data for the selected program, extracting the TS packets (PID=3) for channel 2 included in the first TS data D2A, the TS packets (PID=15) for channel 6 included in the second TS data D2B, and the TS packets (PID=23) for channel 8 included in the third TS data D2C, as shown in FIG. 4(E).

In addition, at this time, the TS separator 34 extracts the TS packets having one piece of audio data for the specified program, extracting the TS packets (PID=4) for channel 2 included in the first TS data D2A, for example, as shown in FIG. 4(F).

In this way, one program is selected from each of 3 pieces of TS data D2A, D2B, and D2C received by the first, second and third receiver systems. The pictures of the three programs can be displayed on the display. The sound of one program out of the three programs can be played.

In this case, for example, the screen of the display formed of the CRT (Cathode Ray Tube) displays the picture of each program in one area out of three areas that the screen is divided into. The sound of one program out of the displayed programs is given from the speaker provided in the display unit.

Figure 5:
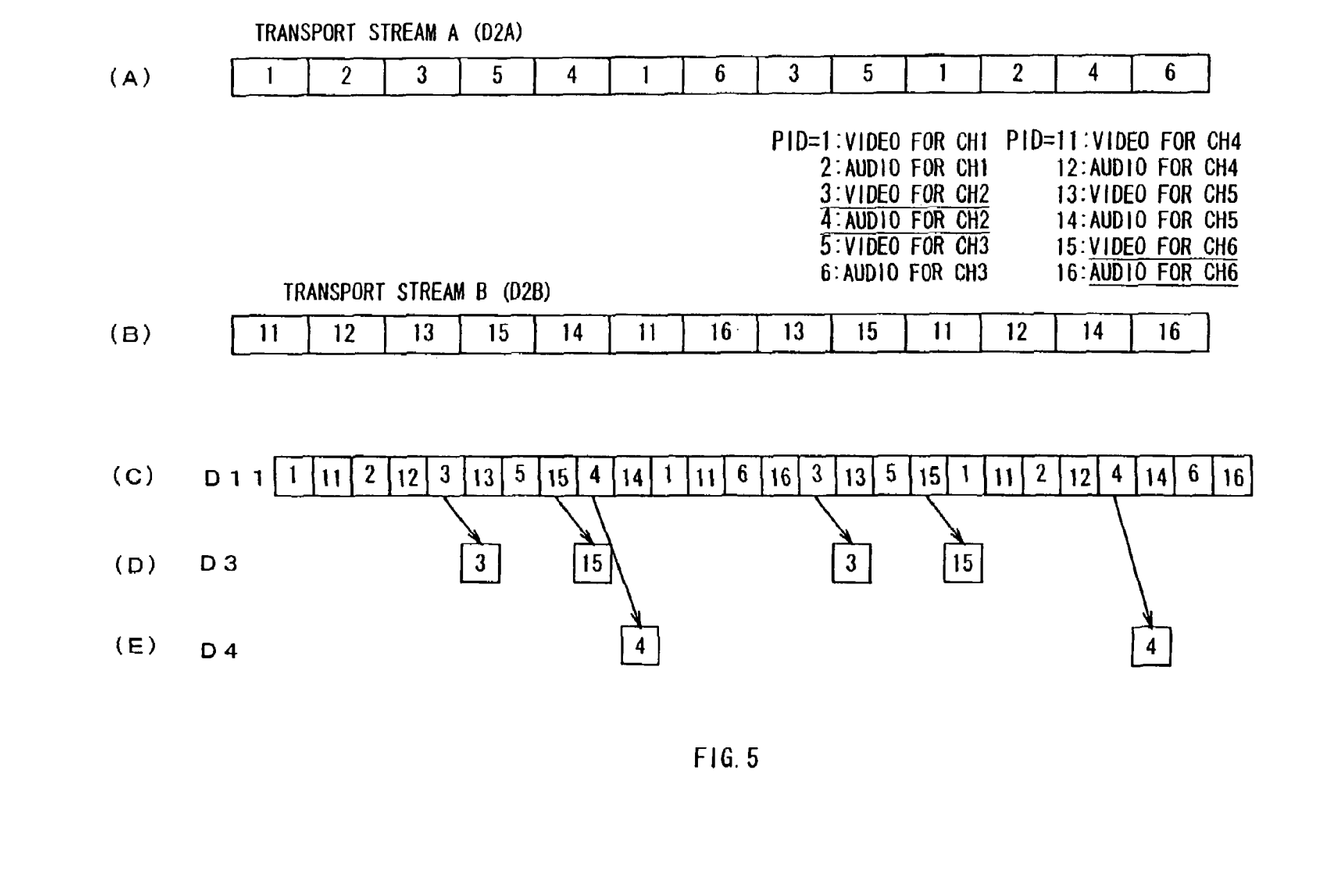
FIG. 5 is a schematic diagram explaining extracting processing to select one program from each of two transport streams.

On the contrary, in the case where the user selects programs each included in the TS data D2A or D2B obtained through the two receiver systems (for example, the first receiver system 3A and the second receiver system 3B) out of three receiver systems, the two pieces of TS data D2A (FIG. 5(A)) and D2B (FIG. 5(B)) are read out from the FIFOs with a double clock by the timing controller 32 as shown in FIG. 5. These data are multiplexed as data compressed in the temporal axis direction as shown in FIG. 5(C) and then, are supplied to the TS separator 34.

Then, the TS separator 34, by extracting only the TS packets having video data for the selected programs, extracts the TS packets (PID=3) for channel 2 included in the fist TS data D2A and the TS packets (PID=15) for channel 6 included in the second TS data D2B, for example, as shown in FIG. 5(D).

Further, at this time, the TS separator 34, by extracting the TS packets having audio data for one of the selected programs, extracts the TS packets (PID=4) for channel 2 included in the first TS data D2A, for example, as shown in FIG. 5(E).

In this way, one program can be selected from each of two pieces of TS data D2A and D2B received by the first and second receiver system, and the pictures of the total two programs and the sound of one program out of two can be displayed at the display.

In this case, the picture of each program is displayed in one area of two areas that the screen in divided into, and the sound of one program out of the displayed programs can be given from the speaker provided at the display unit.

Figure 6:
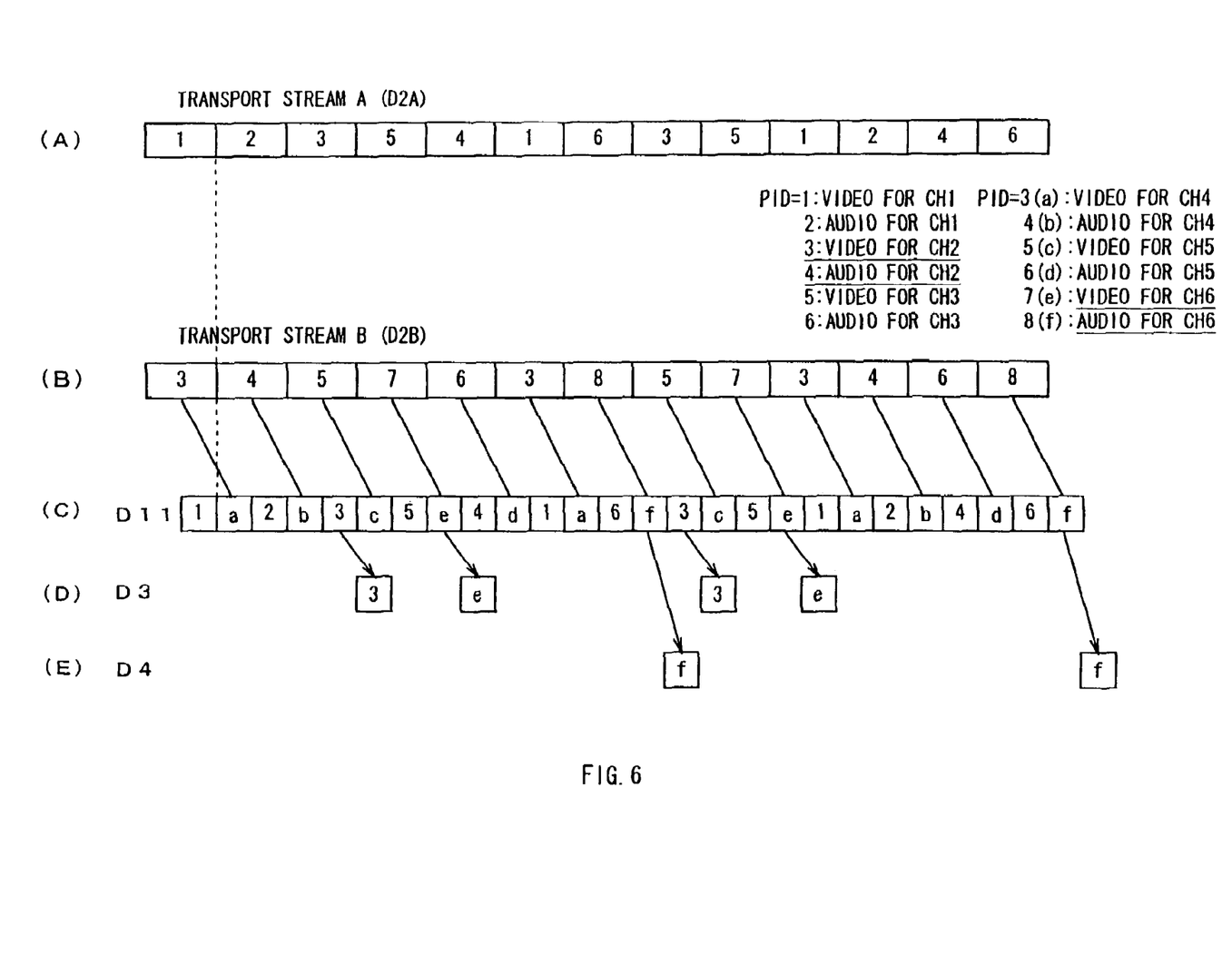
FIG. 6 is a schematic diagram explaining extracting processing in the case where the PIDs are identical when selecting one program from each of two transport streams.

Furthermore, on the contrary, when the user selects a program from each of TS data D2A and D2B obtained by two receiver systems (for example, the first receiver system 3A and the second receiver system 3B) out of the three receiver systems, if TS packets having the identical PIDs exist in the selected two TS data D2A and D2B, the two TS data D2A (FIG. 6(A)) and D2B (FIG. (B)) are read out from the FIFOs with the double clock by the timing controller 32 and then are multiplexed as data compressed in the temporal axis direction as shown in FIG. 6(C). In this case, the sync code detecting/interchanging unit 31B has interchanged the PID of the TS packet in the second TS data D2B, which was the same as that in the first TS data D2A, so that the PIDs of the TS packet for the channel 4 in the second TS data D2B has been changed from "PID=3" to "PID=a", as shown in FIG. 6(C). In this way, the TS data D2B having the changed PID of the TS packet and the TS data D2A having the original PID are multiplexed by the multiplexer 51, to obtain a sequence of TS packets having PIDs different from each other, as shown in FIG. 6(C). This sequence of TS packets is supplied to the TS separator 34.

Then the TS separator 34 extracts only the TS packets having video data for the selected program to extract the TS packets (PID=3) for channel 2 included in the first TS data D2A and the TS packet (PID=7(e)) for channel 6 included in the second TS data D2B, for example, as shown in FIG. 6(D).

In addition, at this time, the TS separator 34 extracts the TS packet having audio data for one program out of the selected ones to extract the TS packets (PID=8(f)) for channel 6 included in the first TS data D2A, for example, as shown in FIG. 6(E).

In this way, one program can be selected from each of two pieces of TS data D2A and D2B received by the fist and second receiver systems, the pictures of the total two programs and the sound of one program out of them can be displayed at the display.

In this case, the picture of each program is displayed in one area out of two areas which the screen is divided into, and the sound of one program out of them being displayed is given from the speaker provided at the display.

Figure 7:
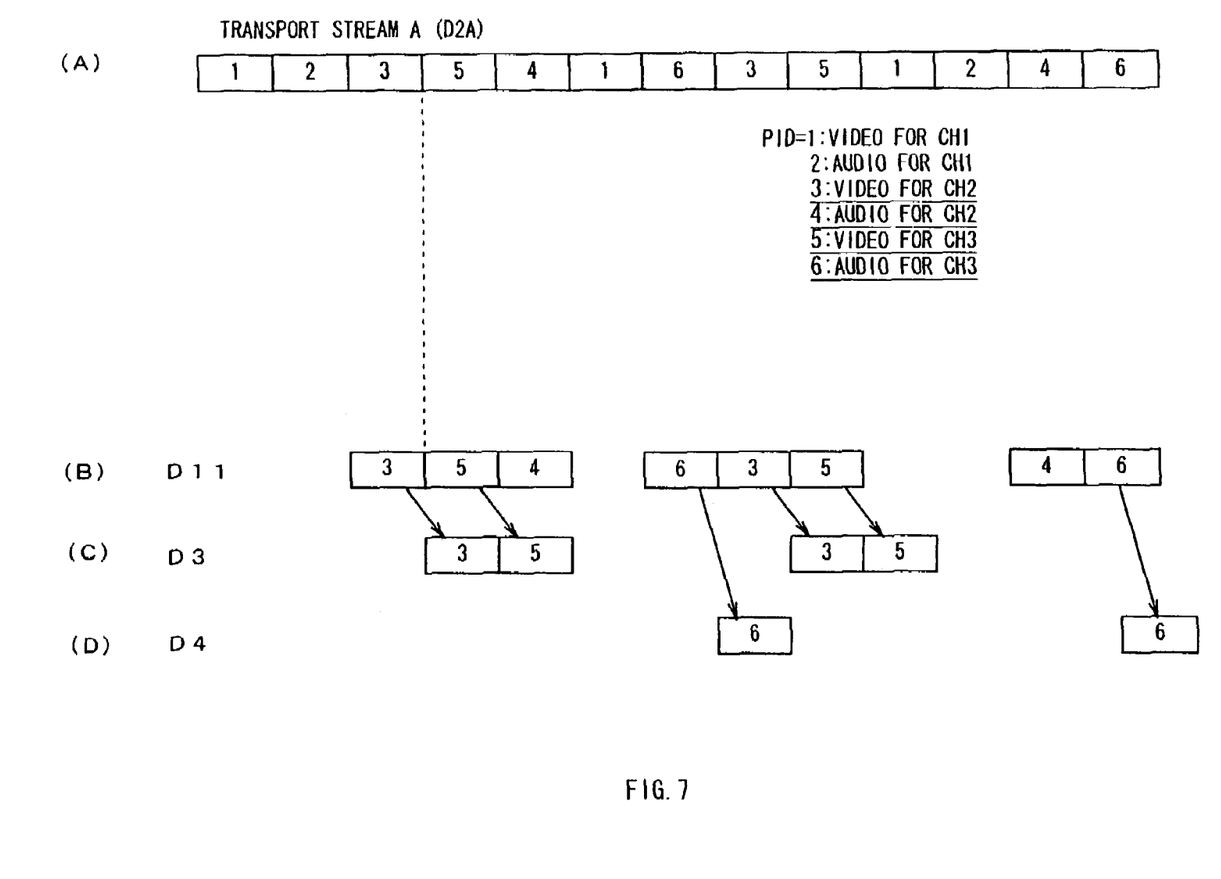
FIG. 7 is a schematic diagram explaining extracting processing to select two programs from one transport stream.

Furthermore, on the contrary, in the case where the user selects two programs included in the TS data D2A obtained by one receiver system (for example, the first receiver system 3A) of the three receiver systems, as shown in FIG. 7, one piece of TS data D2A (FIG. 7(A)) is read out from the FIFO with a normal clock by the timing controller 32, and is supplied to the TS separator 34 as data non-compressed in the temporal axis direction as shown in FIG. 7(B).

Then, the TS separator 34 extracts only the TS packets having video data for the selected programs to extract the TS packets (PID=3) for channel 2 included in the first TS data D2A and the TS packets (PID=5) for channel 3 included in the first TS data D2A as shown in FIG. 7(C), for example.

In addition, at this time, the TS separator 34 extracts the TS packets having audio data for one program out of the selected programs to extract the TS packets (PID=6) for channel 3 included in the first TS data D2A, for example, as shown in FIG. 7(D).

In this way, two programs are selected from the one piece of TS data D2A received by the first receiver system, the pictures of the two programs can be displayed at the display unit, and the sound of one program out of the two can be played.

In this case, the picture of each program is displayed in one area of two areas which the screen is divided into and the sound of one program out of the programs being displayed are given from the speaker provided at the display unit.

In this way, in the case where the user specifies plural programs, the receiving device 1 selects a digital broadcasting signal or the TS data reproduced from the digital VTR corresponding to the specified program in the first and second receiver systems 3A and 3B and the third receiver system for receiving TS data through the IEEE1394 interface 50, sequentially performs the demodulating and the error correction processing with the corresponding digital demodulator and the error correction unit, and then separates and extracts video TS packets for one or more program(s) and audio TS packets for one program specified by the obtained first, second and third TS data D2A, D2B and D2C.

After that, the obtained video TS packet data D3 for plural programs are simultaneously decoded by the video multi-decode processor 14 and the audio TS packet data D4 for one program is decoded by the audio decode processor 15.

In addition, the pictures for plural programs specified based on the obtained video data D5A and D6A are subjected to signal processing for display on multi-screen by the display processor 18, and the sound of the specified program is selected by the audio processor 21.

Thus, the receiving device 1 can receive plural programs from the plural digital broadcasting signals and can display them on multi-screen, thereby making it possible to have a high function with respect to display on a screen.

Further, in the receiving device 1, the selected-channel extracting unit 13 can separate the TS packets for programs specified by the user from the TS data D2A, D2B, and D2C correspondingly to the inputs of plurality of TS data D2A, D2B and D2C, so that it is not necessary to provide plural demultiplexers for extracting TS packets for a program specified by the transport stream, thereby making it possible to construct it simply.

According to the above-mentioned structure, the TS data D2A, D2B, D2C output from the first, second, third receiver systems are selected by the selected-channel extracting unit 13 as required, the TS packets having various kinds of data such as pictures and sound for a specified program included in the selected TS data D2A, D2B and D2C are separated and extracted, thereby making it possible to make an application efficient with a simple structure. Thus, it is possible to significantly improve its function with a simple structure.

Figure 8:
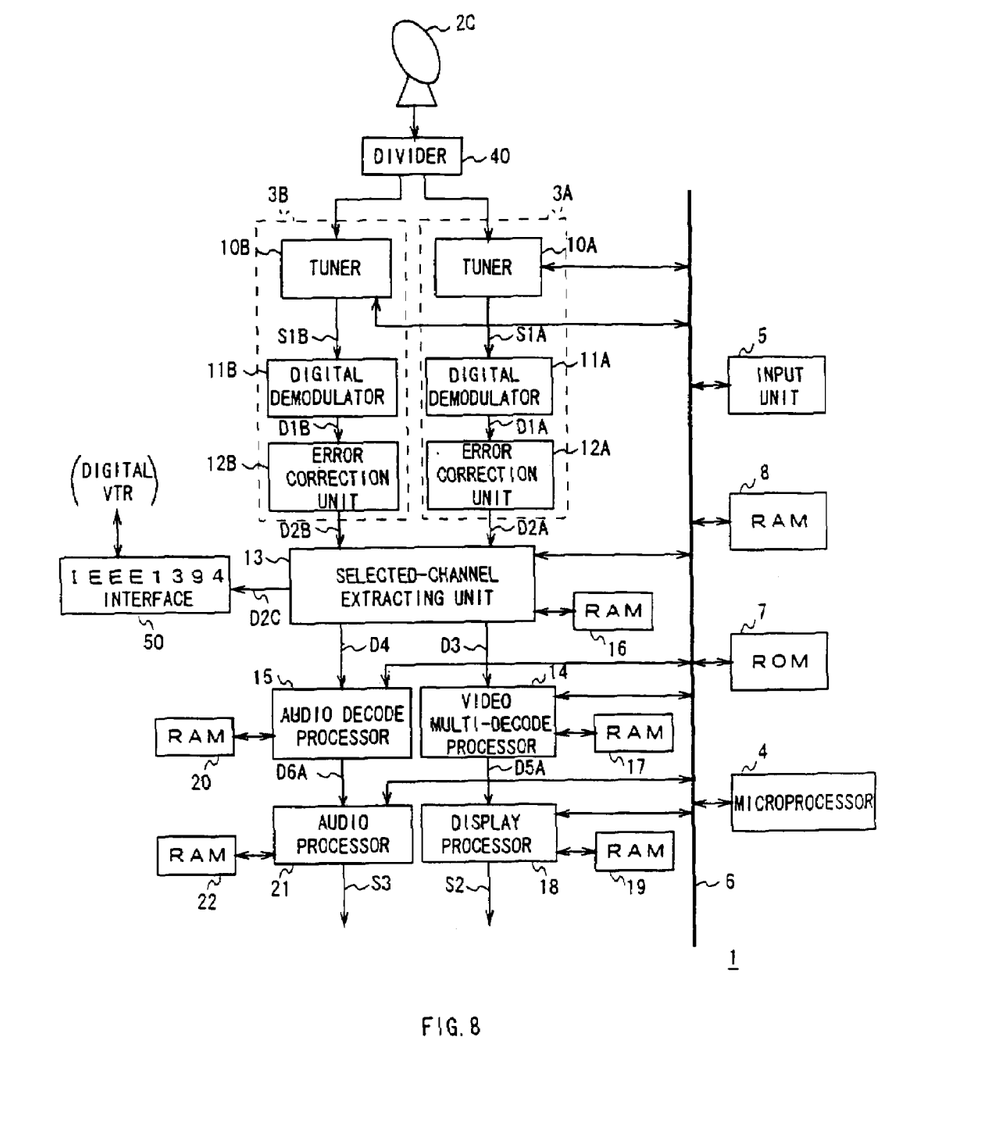
FIG. 8 is a block diagram showing another embodiment.

Note that, in the aforementioned embodiment, two antennae are provided. However, as shown in FIG. 8, a signal from one antenna 2C can be divided into two signals by a divider 40, and be supplied to the first and second receiver systems. That is, in the case of providing two antennas, digital broadcasting signals from two satellites can be received, and in the case of providing only one antenna, a signal corresponding to two transponders in the digital broadcasting signal from one satellite can be selected.

Further, in the embodiment described above, the selected-channel extracting unit 13 is constructed as a separating device according to the present invention as shown in FIG. 2. However, the present invention is not only limited to this but various kinds of structures can be applied as the structure of the selected-channel extracting unit 13 as long as the data of the specified sequences can be separated and extracted from the data stream generated by multiplexing plural sequences of data in a prescribed unit.

In this case, in the embodiment described above, the TS selector/multiplexer 30 is comprised of the first, second and third sync code detecting/interchanging units 31A, 31B and 31C, the FIFOs 33A, 33B, and 33C, and the timing controller 32 as the selecting means for receiving plural data streams and selecting the corresponding part or all of the data streams from among the received plural data streams, as shown in FIG. 2. However, the present invention is not limited thereto and other various kinds of structures can be applied.

Furthermore, in the embodiment described above, the TS separator 34 serving as the separating/extracting means for separating and extracting data (video data and audio data) of the sequences specified by the user (pictures and sound of the specified program) included in the TS data D2A, D2B and D2C is placed at the stage following the FIFOs 33A, 33B and 33C and the timing controller 32, the multiplexer 51 serving as the multiplexing means for multiplexing these data. However, the present invention is not only limited to this but also the TS separator 34 can be placed at the stage preceding the FIFOs 33A, 33B, 33C, the timing controller 32 and the multiplexer 51, and the same effects as the above embodiment can be obtained.

Furthermore, in the embodiment described above, the selected-channel extracting unit 13 multiplexes and outputs video and audio data for the programs specified by the user in the form of a TS packet. However, the present invention is not only limited to this but also video and audio data for the programs specified by the user can be multiplexed and output in the form of a signal, such as ES (Elementary Stream) and PES (Packetized Elementary Stream). In this case, the signal receiving device can be so constructed that the selected-channel extracting unit 13 outputs a control signal so as to make the video multi-decode processor 14 and the audio decode processor 15 decide what program the video TS data D3 and audio TS data D4 to be supplied at that moment belong to.

Furthermore, in the embodiment described above, the selected-channel extracting unit 13 is constructed so as to cope with the inputs of three transport streams. However, the present invention is not only limited to this but also, the selected-channel extracting unit 13 can cope with four or more transport streams as long as it is constructed so as to receive plural data streams, to select corresponding part or all data streams from among the received plural data streams, and to separate and extract data of a specified sequence included in the selected data streams.

Furthermore, in the embodiment described above, identical PIDs of TS packets are interchanged. However, the present invention is not limited thereto but also, for example, with respect to a TS packet having another identical PID, a flag to specify the channel number can be added to its header to output the TS packet from the selected-channel extracting unit 13 through a control line CONT.

Furthermore, in the embodiment described above, the receiving device according to the present invention is applied to a receiving device in a digital broadcasting system. However, the present invention is not limited thereto but also can be applied to other various types of receiving device such as a receiving device for cable television broadcasting. In this case, a program of a different broadcasting system can be extracted by making a receiver system cope with the different broadcasting system (for example, CS (Communications Satellite) broadcasting for distributing programs via a communications satellite, BS (Broadcasting Satellite) broadcasting for distributing program via a broadcasting satellite), cable television broadcasting, or digital broadcasting for distributing with a ground wave).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for receiving, separating and decoding a plurality of data streams, comprising:
   a receiver operable to produce an initial data stream containing multiplexed data packets representing a plurality of data programs from a plurality of transmitted data streams received over a communication channel;
   a separating device operable to produce an intermediate data stream containing multiplexed data packets representing one or more selected ones of the data programs chosen from the initial data stream and to output the intermediate data stream as packetized data, the separating device including a multiplexer operable to produce a multiplexed data stream including the initial data stream and a separator operable to extract the selected data programs from the multiplexed data stream;
   an interchange unit operable to change a first packet identifier of a first data packet of the intermediate data stream produced by the separating device to a unique packet identifier in the event that the first packet identifier is the same as a second packet identifier of a second data packet of the produced data stream, and to output resultant data; and
   a decode processor operable to decode the resultant data such that the multiplexed data packets representing the selected data programs are associated with one another, the decode processor including a video decode processor operable to decode a video portion of the resultant data corresponding to the selected data programs and to generate decoded video data, an audio decode processor operable to decode an audio portion of the resultant data corresponding to one of the selected data programs and to generate decoded audio data, a display generator operable to process the decoded video data for multi-screen displaying, and an audio generator operable to process the decoded audio data for playing.

2. An apparatus for receiving, separating and decoding a plurality of data streams, comprising:
   a receiver operable to produce an initial data stream containing multiplexed data packets representing a plurality of data programs from a plurality of transmitted data streams received over a communication channel;
   a separating device operable to produce an intermediate data stream containing multiplexed data packets representing one or more selected ones of the data programs chosen from the initial data stream and to output the intermediate data stream as packetized data, the separating device including a separator operable to extract the selected data programs from the initial data stream and a multiplexer operable to produce a multiplexed data stream including each of the selected data programs extracted by the separator;
   an interchange unit operable to change a first packet identifier of a first data packet of the intermediate data stream produced by the separating device to a unique packet identifier in the event that the first packet identifier is the same as a second packet identifier of a second data packet of the produced data stream, and to output resultant data; and
   a decode processor operable to decode the resultant data such that the multiplexed data packets representing the selected data programs are associated with one another, the decode processor including a video decode processor operable to decode a video portion of the resultant data corresponding to the selected data programs and to generate decoded video data, an audio decode processor operable to decode an audio portion of the resultant data corresponding to one of the selected data programs and to generate decoded audio data, a display generator operable to process the decoded video data for multi-screen displaying, and an audio generator operable to process the decoded audio data for playing.

3. A method for decoding packet data, comprising the steps of:
   producing at least one initial data stream containing multiplexed data packets, the multiplexed data packets representing a plurality of data programs from a plurality of distinct signals received over at least one communication channel;
   producing at least one intermediate data stream containing selected multiplexed data packets representing one or more selected ones of the data programs chosen from the at least one initial data stream and outputting the at least one intermediate data stream as packetized data, the step of producing the at least one intermediate data stream including multiplexing each of the initial data streams onto a multiplexed data stream and separating each of the selected data programs from the multiplexed data stream;

changing a first packet identifier of a first data packet of the at least one intermediate data stream to a unique packet identifier in the event that the first packet identifier is the same as a second packet identifier of a second data packet of the at least one intermediate data stream, and outputting resultant data; and decoding the resultant data such that the selected multiplexed data packets representing each of the one or more selected data programs are associated with one another, the step of decoding the resultant data including decoding a video portion of the resultant data corresponding to the one or more selected data programs and decoding an audio portion of the resultant data corresponding to the one or more selected data programs.

4. A method for decoding packet data, comprising the steps of:

producing at least one initial data stream containing multiplexed data packets, the multiplexed data packets representing a plurality of data programs from a plurality of distinct signals received over at least one communication channel;

producing at least one intermediate data stream containing selected multiplexed data packets representing one or more selected ones of the data programs chosen from the at least one initial data stream and outputting the at least one intermediate data stream as packetized data, the step of producing the at least one intermediate data stream including separating each of the selected data programs from the at least one initial data stream and multiplexing each of the selected data programs onto a multiplexed data stream;

changing a first packet identifier of a first data packet of the at least one intermediate data stream to a unique packet identifier in the event that the first packet identifier is the same as a second packet identifier of a second data packet of the at least one intermediate data stream, and outputting resultant data; and decoding the resultant data such that the selected multiplexed data packets representing each of the one or more selected data programs are associated with one another, the step of decoding the resultant data including decoding a video portion of the resultant data corresponding to the one or more selected data programs and decoding an audio portion of the resultant data corresponding to the one or more selected data programs.

* * * * *